N. P. EASLING.
EGG TESTER.
APPLICATION FILED JULY 10, 1911.
1,010,744.
Patented Dec. 5, 1911.
2 SHEETS—SHEET 1.
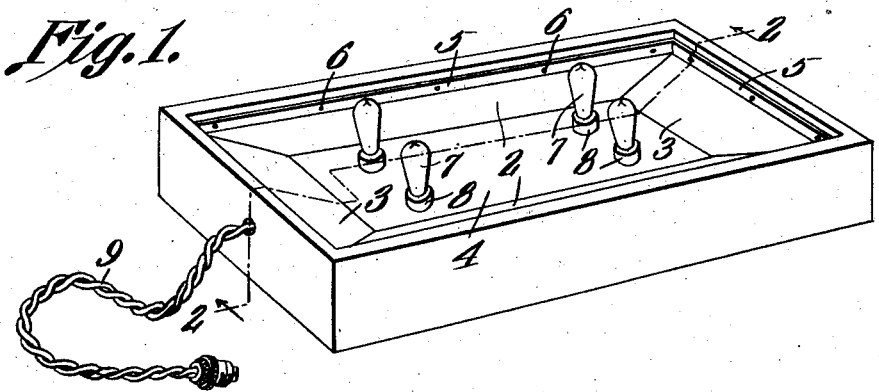
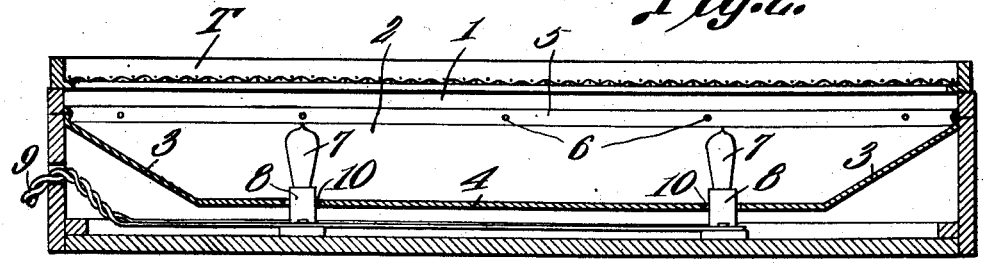
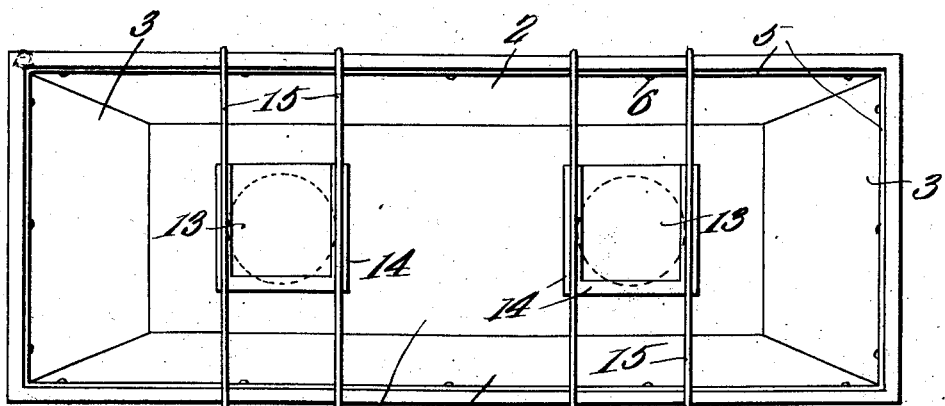
Witnesses:
Newton P. Easling,
Inventor,
by C. A. Snow & Co.
Attorneys.

N. P. EASLING.
EGG TESTER.
APPLICATION FILED JULY 10, 1911.
1,010,744.
Patented Dec. 5, 1911.
2 SHEETS—SHEET 2.
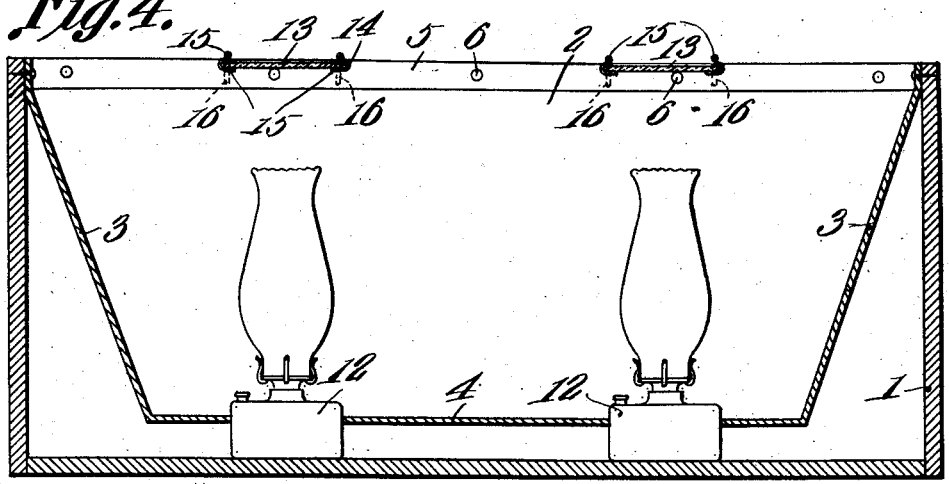
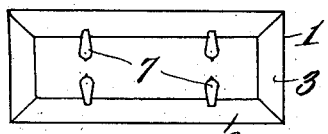
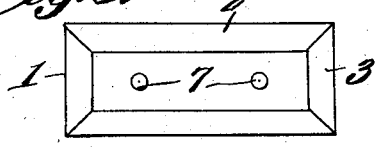
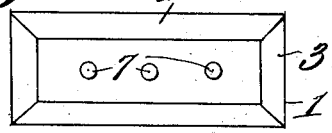
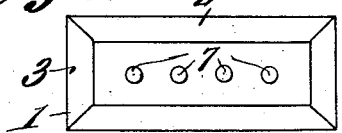
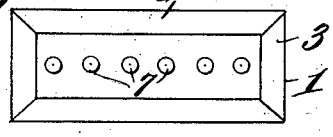
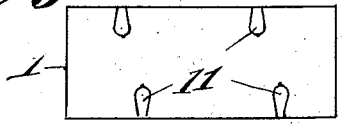
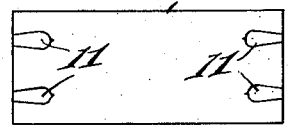
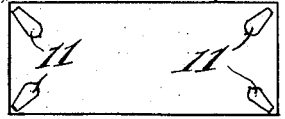
Witnesses:
Newton P. Easling,
Inventor,
by C. A. Snow & Co.
Attorneys
COLUMBIA PLANOGRAPH CO., WASHINGTON, D. C.

UNITED STATES PATENT OFFICE.

NEWTON P. EASLING, OF PEKIN, ILLINOIS.

EGG-TESTER.

1,010,744.     Specification of Letters Patent.     Patented Dec. 5, 1911.

Application filed July 10, 1911. Serial No. 637,719.

*To all whom it may concern:*

Be it known that I, NEWTON P. EASLING, a citizen of the United States, residing at Pekin, in the county of Tazewell and State of Illinois, have invented a new and useful Egg-Tester, of which the following is a specification.

This invention relates to egg testers.

The object of the invention is, in a simple and practical manner, to facilitate and expedite the examination of eggs used for incubator purposes, to enable the user to determine at a glance which of the eggs are fertile and which barren, the arrangement of the structure being such that a large number of eggs can be examined at one time, thereby to allow the attendant to remove those eggs which are non-fertile, and which are not in the least affected by having been subjected to the heat of the incubator for three or seven days, thus effecting a saving in both time and labor in accomplishing the object, in that the individual inspection of the eggs, as heretofore practiced, is substituted by a wholesale examination that in its results is fully as effective as that obtained by the methods generally followed.

With the above and other objects in view, as will appear as the nature of the invention is better understood, the same consists, generally stated, in an egg tester embodying a casing having a flat bottom and inclined sides and ends that constitute reflectors, and an illuminating medium arranged within the casing, the light rays from which are directed upward by the deflectors. The top of the casing is open, and serves as a rest for the trays containing the eggs, these, as is well known, having bottoms formed from relatively large wire mesh that will permit the reflected rays of the light to render the eggs semi-transparent, or translucent, and to a degree that will enable the operator at a glance, to remove those eggs which are non-fertile, and to retain those in which the life germ has started to develop. At the same time that the eggs are inspected, they may be turned, thus saving a separate operation that has to be observed in the ordinary methods followed in inspecting eggs. The light may be obtained from any source, such as from incandescent electric lamps, or from a coal oil lamp, and as the latter will be most generally used, owing to the fact that electricity is not always accessible, it is necessary that means should be provided whereby the heat from the lamp or lamps shall not cook the eggs that are disposed over the upper ends of the chimneys, and this is secured by the employment of sheets of mica, which are arranged in metallic frames that are connected with crossbars that rest upon the upper edges of the casing, and in addition to serving as a means for supporting the heat deflectors, these bars may be utilized for supporting trays that may be too short to rest upon the casing. As will be obvious, the employment of the mica deflectors will not detract from the efficiency of the apparatus, inasmuch as those eggs directly over the deflectors may be inspected with the same ease and certainty as those remote therefrom.

Where incandescent lights are employed, the bulbs may be arranged in various ways, such as disposing them in vertical position, or in horizontal position, projecting inward from the sides or ends, or both. When the latter arrangement is employed, a shallower casing may be employed than where a coal oil lamp is used, thus materially lessening the cost of production of the article, and at the same time rendering it lighter and thus easier to handle.

Further and more specific details of construction will be hereinafter described, illustrated in the drawings, and claimed.

In the accompanying drawings forming a part of this specification, and in which like characters of reference indicate corresponding parts: Figure 1 is a perspective view of one form of egg tester, wherein incandescent lamps are employed as the illuminating medium. Fig. 2 is a longitudinal sectional view through the structure shown in Fig. 1, on a slightly enlarged scale. Fig. 3 is a top plan view of a modified form of tester, in which coal oil lamps are employed for producing the necessary light. Fig. 4 is a longitudinal sectional view through the structure shown in Fig. 3. Figs. 5, 6, 7, 8, 9, 10, 11, 12, and 13 are plan views, somewhat in the nature of diagrams, displaying the different ways in which the electric light bulbs may be arranged.

Referring to the drawings, and to Figs. 1–2, 5–13, 1 denotes a casing which may be constructed from any suitable material, and be of any size and depth desired, but from a standpoint of economy and lightness, it is preferred to construct the casing of wood. Secured in the casing is a reflector comprising inclined sides and ends 2 and 3 respectively, and a flat bottom 4. This reflector may be constructed from any material suited to the purpose, but from the standpoint of economy, and also to lessen the liability to breakage, it is preferred to employ highly polished metal, although ordinary sheet tin may be employed. The various sections of the reflector may be secured together in any preferred manner, generally by soldering, and the upper edges of the sides and ends are formed with flanges 4 and 5 through which are driven tacks or nails 6 to secure the reflector within the casing, a suitable space above the bottom thereof. In the forms of the invention shown in the figures named, incandescent electric lights 7 are employed for the purpose of illumination, the sockets 8 of which are secured to the bottom of the casing, the conductors 9 being extended through an opening in the end wall of the casing, and being connected to the sockets in the usual manner. As shown in Figs. 1, 2, 6, 7, 8 and 9, the bulbs 7 are arranged in a vertical position, the bottom 4 of the reflector being provided with openings 10 through which the sockets 8 project. As shown in Figs. 1 and 2, the bulbs are four in number and are arranged in the form of a rectangle, while in the forms of the invention shown in Figs. 6, 7, 8 and 9, the lamps are arranged in a row, thus to increase the number, of which the range is indefinite, two lights being shown in Fig. 6, and six in Fig. 9. In each of the figures just named, the casing is provided with the deflectors, but in the forms of the invention shown in Figs. 5, 10, 11, 12 and 13 the reflectors are discarded, and the bulbs 11 are arranged in a horizontal plane, or one parallel with the bottom. These last-named figures show various manners in which the bulbs may be disposed, any one of which is effective for the purpose desired.

As most poultry farms are located in the rural districts in which access to electricity is not always possible, it is essential, to secure the proper scope for the invention, to adapt it for use in any location where it may be desired, and to secure this result, the form of the invention shown in Figs. 3 and 4 is employed, in which ordinary coal oil lamps 12 are substituted for the electric lights. The two reservoirs of these lamps extend through openings in the bottom reflector, and rest upon the bottom of the casing, and are thus prevented from shifting their position. As will be obvious, the heat directed upward from the chimneys would be sufficient to cook and thus sterilize any eggs contained in a tray resting upon the casing. To obviate this difficulty, and at the same time not to interfere with the operation of the tester, heat deflectors are disposed over the chimneys, each of which consists of a sheet of mica 13, three of the edges of which are secured in the three-sided frame 14, the object of this arrangement being to permit removal and insertion of the mica when desired. Each of these frames is secured to two supporting bars 15, which are of a length to span the casing, and held in place, in this instance, by having their terminals bend at right angles to their length to provide stops or keepers, which by contact with the sides of the casing will be held firmly in position. These bars in addition to constituting a means for supporting the heat deflectors, may also be utilized as rests for trays T that are too small to stand on the casing and rest upon its upper edges.

In the use of the apparatus, after any convenient time, the tray containing the eggs is placed upon the casing, the latter being placed in a dark room. By looking downward upon the eggs, the operator can instantly detect which of the eggs are fertile, and which are barren, as the life germ in the former will be plainly visible, while the latter will be translucent, and of a clear yellowish color. The length of time that the non-fertile eggs have been in the incubator will not damage them in the least for domestic purposes, and they are removed by the operator at inspection while those that are fertile are left to hatch.

It will be seen that there is practically no limit to the number of eggs that may be inspected at one operation, as it will depend entirely upon the size of the casing and of the incubator trays. It has been found in operation that it is just as easy successfully to inspect two hundred and fifty eggs at one operation as to inspect a dozen.

It will be seen from the foregoing description, that although the apparatus herein described are simple in character, cannot become deranged from use, they may readily be constructed by persons of ordinary mechanical ability.

I claim:

1. An egg tester comprising a casing, a reflector arranged within the casing and comprising inclined sides and ends and a bottom, the bottom having an opening therein, and the sides and ends being secured at their upper edges to the casing to support the reflector above the bottom of the casing, a lamp arranged on the bottom of the casing and extending through the opening in the bottom of the reflector, a pair of bars spanning the casing and secured at their terminals to the casing and a heat deflector supported by the said bars over the lamp.

2. An egg tester comprising a casing, a reflector arranged within the casing and comprising inclined sides and ends and a bottom, the bottom having openings therein and the sides and ends being secured at their upper edges to the casing to support the reflector above the bottom of the casing, oil lamps seated on the bottom of the casing and extending through the openings in the bottom of the reflector, and transparent heat deflectors arranged above the chimneys of the lamps.

3. An egg tester comprising a casing, a reflector arranged within the casing and comprising inclined sides and ends and a bottom, the bottom having openings therein and the sides and ends being secured at their upper edges to the casing to support the reflector above the bottom of the casing, oil lamps seated on the bottom of the casing and extending through the openings in the bottom of the reflector, and combined tray supports and heat deflectors arranged above the chimneys of the lamps.

4. An egg tester comprising a casing, a reflector arranged within the casing and constituting inclined sides and ends and a bottom, the said bottom having openings therein and the sides and ends secured at their upper edges to the casing to support the reflector above the bottom of the casing, lamps arranged on the bottom of the casing and extending through the openings in the bottom of the reflector, a pair of bars spanning the casing above each of the lamps and secured at their terminals to the casing, a three sided casing secured to each pair of the said bars above the respective lamps, and a heat deflector removably secured to each of the said casings.

In testimony that I claim the foregoing as my own, I have hereto affixed my signature in the presence of two witnesses.

NEWTON P. EASLING.

Witnesses:
GRACE JANSSEN,
WILLIAM S. PRETTYMAN.

---

Copies of this patent may be obtained for five cents each, by addressing the "Commissioner of Patents, Washington, D. C."